United States Patent
Abel

[11] 3,782,835
[45] Jan. 1, 1974

[54] OPTICAL INSTRUMENTS
[75] Inventor: Irving Raymond Abel, Lexington, Mass.
[73] Assignee: The United States of America as represented by the Administrator of the National Aeronautics and Space Administration, Washington, D.C.
[22] Filed: Apr. 10, 1972
[21] Appl. No.: 242,662

[52] U.S. Cl.............. 356/216, 356/43, 350/7, 350/285, 250/236
[51] Int. Cl.............. G01j 1/56, G01j 5/48
[58] Field of Search ............ 350/6, 7, 22, 23, 350/27, 55, 285, 273, 275, 288, 289; 250/203, 236; 356/216, 203, 17, 18, 24, 25, 43

[56] References Cited
UNITED STATES PATENTS
3,443,853  5/1969  Todd, Jr. ............... 356/216
2,873,381  2/1959  Lallroesch ............. 350/7
3,455,623  7/1969  Harris .................. 350/27

*Primary Examiner*—David Schonberg
*Assistant Examiner*—Conrad Clark
*Attorney*—Marvin J. Marnock et al.

[57] ABSTRACT

A wide angle, low focal ratio, high resolution, catoptric, image plane line scanner which embodies three interrelated main features, a reflective improvement on the Schmidt principle, a polar line scanner in which all field elements are brought to and corrected on axis, and a scanner arrangement in which the aperture stop of the system, located in a relay unit, is effectively imaged at the center of curvature of a spherical primary mirror in place of the physical stop unit in the classical Schmidt configuration, making the system consequently much more compact. The system scans at a large radial angle and an extremely high rate of speed with relatively small scanning mirrors, and since it is symmetrical about the optical axis, the obscuration is independent of scan angle.

13 Claims, 3 Drawing Figures

OPTICAL INSTRUMENTS

BACKGROUND OF THE INVENTION

This invention relates generally to the field of optical instruments, and more particularly to scanning radiometers and spectroradiometers. Such instruments are used for example in earth resources surveys made from high altitude vehicles and satellites using radiation in the ultraviolet, visible, and infrared bands of wavelengths.

ORIGIN OF THE INVENTION

In order to be useful such surveys must cover significant ground area with adequate resolution: a rapid scan rate is necessary, which means that the optical system must have a low focal ratio and that moving masses must be kept as small as possible. Monochromatic defects must be minimized, chromatic aberrations must be avoided, and any obscuration must be independent of scan angle. This combination of restraints presents a very difficult overall problem, which the present invention was designed specifically to solve.

SUMMARY OF THE INVENTION

The principal object of the invention is accordingly to provide an improved scanning radiometer. Another principal object of the invention is to provide an improved catoptric optical system. Other objectives of the invention are to provide an improved scanning arrangement, to provide catoptric means for minimizing aberrations in an optical system, and to provide an image plane scanning catoptric optical system in which obscuration is independent of scanning angle.

A more detailed object of the invention is to provide a wide angle, high speed, low focal ratio, high resolution, catoptric image plane line scanner of compact dimensions with a rapid scan rate, a large scan angle, a small moving mass, and an obscuration which is independent of scan angle.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

DESCRIPTION OF THE PREFERRED EMBODIMENT

Figure 1:
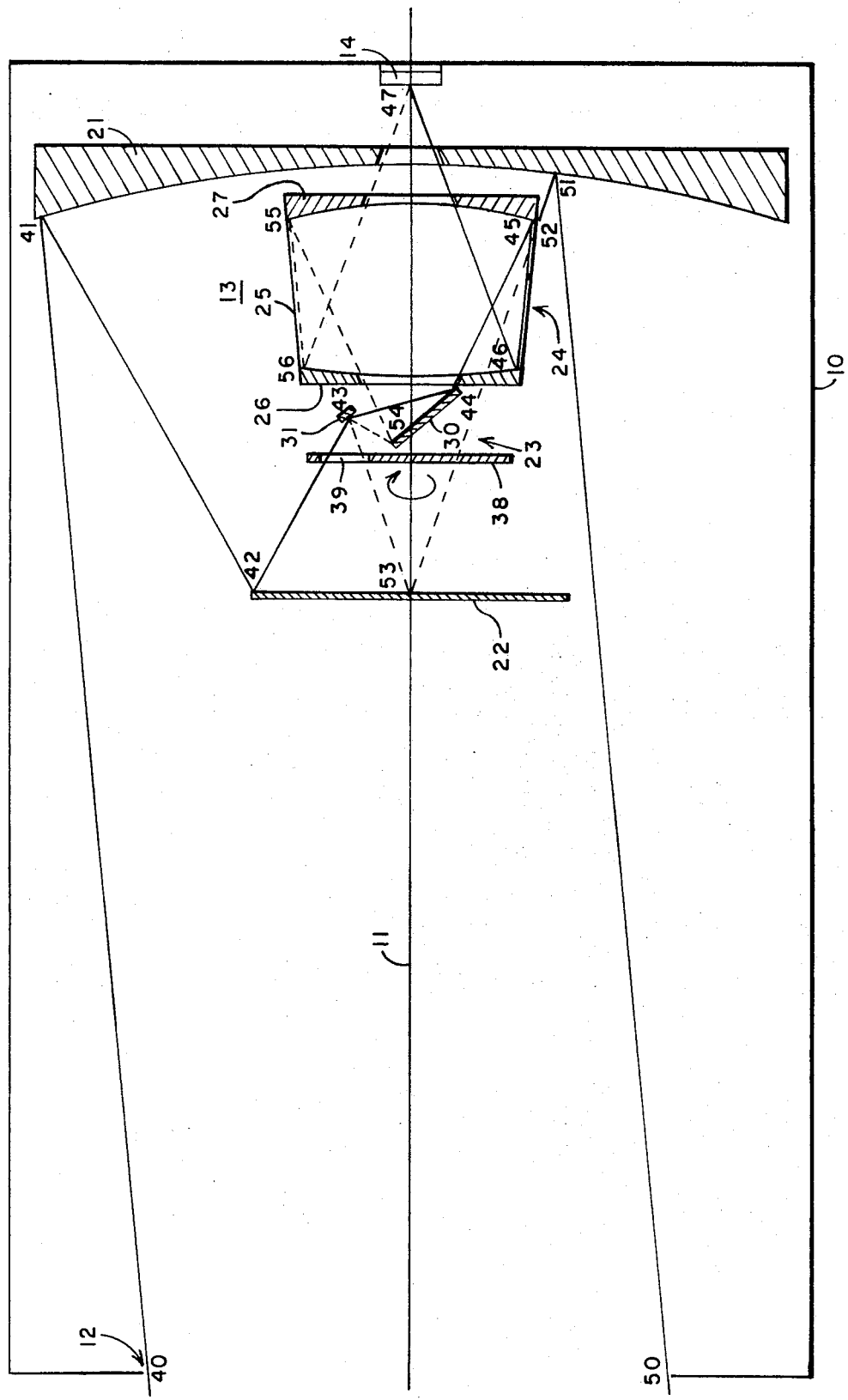
FIG. 1, is a partially schematic vertical longitudinal section of an optical system embodying my invention.

Referring first to FIG. 1, the preferred embodiment of my invention is shown to comprise a housing 10 through which passes the optical axis 11. Radiation entering the housing at an opening 12 is transmitted through a catoptric optical system 13 to a utilization device or detecting means 14 which includes an infrared detector or an array of such detectors, and may also include an initial spectrometer if wavelength analysis is desired.

Optical system 13 includes a spherical primary reflector or mirror 21 having its center of curvature on axis 11, a plane secondary mirror 22, a scanner assembly 23, and relay optics 24 comprising a housing 25 containing a spherical mirror 26 and an aspherical mirror 27. Mirrors 21, 26, and 27 have central apertures and their axes define axis 11. Mirror 27 acts as the aperture stop of the system, and is imaged at the center of curvature of mirror 21 as the entrance pupil of the system.

Scanner assembly 23 comprises a pair of plane mirrors 30 and 31 mounted for unitary rotation about axis 11, which passes through mirror 30 at an acute angle. These mirrors are normal to a common plane containing axis 11 and form opposite faces of a rhomboidal polyhedron. Upon rotation of assembly 23 mirror 31 traces a conical surface coaxial with axis 11.

A mask 38 is mounted between secondary mirror 22 and scanner assembly 23, and has an arcuate aperture or slot 39 through which the converging beam from the secondary mirror may reach the scanner. The purpose of this mask is to cut off from the scanner assembly radiation for the trailing half of the field being obscured, and the angular extent of slot 39 is selected accordingly. If desired one or more calibration sources of radiation may be mounted on mask 38 in the unslotted portion thereof. At each rotation of the scanner assembly radiation for each of such sources would reach detector 47 so that system operation may be continuously monitored.

As an alternative to mask 38 it is possible to interrupt the electric circuit from detecting means 14 in synchronism with the rotation of scanner assembly 23 during the trailing half of each scan.

Mirror 22 is so located, in relation to mirror 21 that parallel light entering the system is focused in a plane perpendicular to axis 11, and mirror 31 continuously intersects this plane in every rotated portion of the scanner assembly. Radiation entering the instrument in a direction having a major component aligned with axis 11 emerges from scanner assembly 23 as a diverging axial beam which enters relay optics 24 through the aperture in reflector 26. This beam is reflected from mirror 27 to mirror 26 and thence as a converging axial beam through the aperture in reflectors 27 and 21 to detecting means 14.

Mirror 27 is basically a spherical mirror, but is "figured" or modified to correct not only for the spherical aberration introduced to the system by mirror 21, but also for that introduced by mirror 26 and due to its own basic spherical characteristics. The concept of catoptrically correcting for the spherical aberration introduced by a spherical reflector is one of the significant contributions of my invention: it differs from the dioptric correction of the classical Schmidt system in that it is equally effective for all wavelengths over a wide range, whereas a refractive correction plate is wavelength sensitive. The improved arrangement more exactly produces the effective on-axis condition for all off-axis field points relative to the spherical primary mirror.

Figure 2:
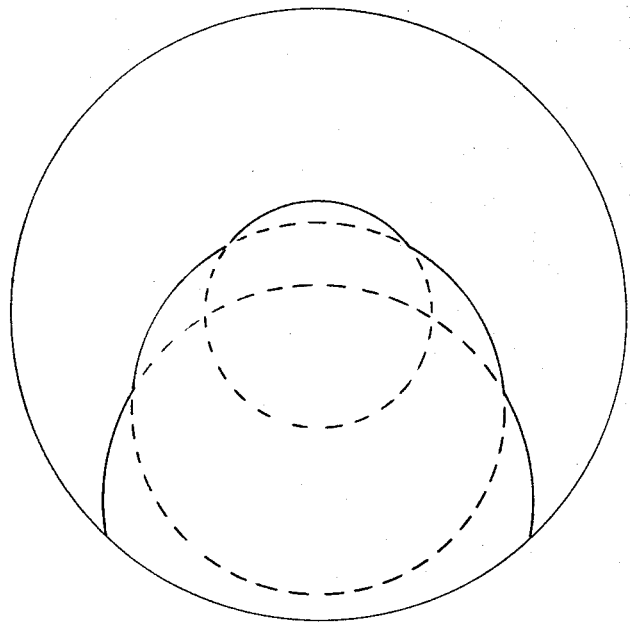
FIG. 2 shows the obscuration present in the system of FIG. 1.

As in any catoptric system a considerable portion of the entrance pupil is obscured by optical elements. FIG. 2 shows the obscurations due to the aperture in mirror 21, to mirror 22, and to relay optics 24, which are seen to largely overlap. The useful area of the entrance pupil at any one instant is the generally crescent shaped area above the obscurations in FIG. 2. As scanner assembly 23 rotates, the obscuration pattern rotates about the center of the entrance pupil so that there is no variation of obscuration with scan angle. This is due to the fact that the system is essentially symmetrical about the axis 11.

Because the path of mirror 31 lies in the focal plane of mirror 21 the former need only be of small size. This minimizes the moving mass of the system, and the scanner assembly operates without difficulty at high speed.

The path of one marginal ray through the optical system may be traced through points 40, 41, 42, 43, 44, 45, 46, and 47. The path of the opposite marginal ray may be traced through points 50 and 51 to point 52, where it is obscured by relay optics housing 24: in the absence of the obscuration the ray would continue through points 53, 43, 54, 55, 56, and 47.

It will be clear that operation of scanning assembly 23 is effective to convert the scan of an arcuately related succession of field elements in the image plane of mirror 21 into rotation of the beam from the scanner about axis 11, accompanied by apparent transverse movement of the field across the beam, the instantaneous intensity of the beam being that of the field element at each rotated portion of assembly. In other words there is provided a polar line scan in which all field elements are brought to the axis and corrected by mirror 27.

In use the instrument is mounted in a suitable vehicle such as an orbiting satellite, so arranged that optical axis 11 is directed toward a field to be scanned. Movement of the vehicle in its orbit carries the optical axis across the field. Rotation of scanner assembly 23 is effective to produce an arcuate linear sweep generally transverse to the direction of movement of the vehicle, its extent being limited by mask 38. By the time the scanner assembly has completed a revolution the vehicle has advanced with respect to the field so that the next occurring linear sweep is displaced laterally with respect to the previous sweep, and a continuous series of sweeps results in complete coverage of the area in question.

By way of illustration if the instrument described above were directed downwardly from a satellite at an altitude of 100 nautical miles and a resulting orbital period of 90 minutes for an earth circuit of 25,000 miles, successive sweeps of earth's surface transverse to the path of the satellite would be spaced along its ground path by roughly 260 feet.

In the embodiment of the invention shown in FIG. 1 the entrance pupil diameter was 17 inches, of which about 47 percent was subject to obscuration. The radii of curvature of mirrors 21 and 26 were 40.8 inches and 25.96 inches respectively. Mirror 27 was deformed from a radius of curvature of 15.163 inches. Mirrors 30 and 31 made angles of 41.25° and 38.5° respectively with planes normal to the axis, mirror 31 had a transverse diameter of 0.245 inches and rotated at a radius of 1.984 inches from axis 11. Slot 39 extended for about 120° around mask 38. Parallel light entering the instrument at an angle of 5.5° with respect to the axis emerged from the scanner axially, and the scanner assembly rotated at 6,000 revolutions per minute.

Figure 3:
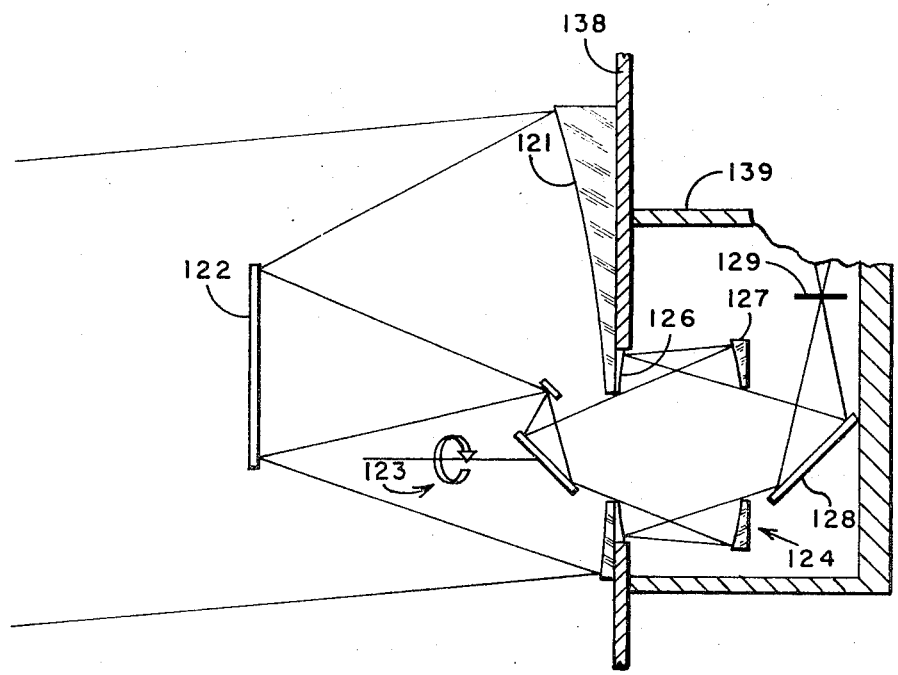
FIG. 3 shows a modification of the invention.

FIG. 3 shows a second embodiment of the invention. Here spherical primary mirror 21, plane secondary mirror 122 and scanning assembly 123 resemble their counterparts in FIG. 1. Relay optics 124 includes spherical mirror 126 and an aspherical mirror 127 is also generally the same, but is located on the opposite side of mirror 121 from assembly 123. The converging beam from relay optics 124 is directed by a folding mirror 128 to a field stop 129, behind which may be located any desired detecting means with or without an initial spectrometer. In the Figure it is suggested that elements 121, 122, and 123 are located outside the shell 138 of a vehicle, and that the remaining elements are located in a closed chamber 139 inside the vehicle.

It will be apparent that this embodiment of the invention includes the same reflecting correction for spherical abberration, the same conversion of arcuate to rotational scanning, and the same relay mirror expedient as the embodiment first described.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. A scanning radiometer comprising, in combination:

input optics having an optical axis and arranged to create, in an image plane generally transverse to said axis, a primary image of the radiation from a field of view;

a scanner assembly rotatable about said axis for converting the scan of an arcuately related succession of field elements in said plane into rotation of a beam directed generally along said axis accompanied by apparent transverse movement of the field across the beam, the instantaneous intensity of said beam being that of the image field element at each particular rotated position of said assembly;

radiation responsive means;

and relay optics for focusing said beam from said assembly on said radiation response means.

2. Apparatus according to claim 1 in which said input optics includes a spherical element and said relay optics includes means for correcting said beam for spherical aberration introduced by said spherical element.

3. Apparatus according to claim 1 in which said input optics includes a spherical mirror and said relay optics includes catoptric means for correcting said beam for aberrations introduced by said spherical mirror.

4. Optical apparatus comprising, in combination:

rotation about an axis and including a first mirror through which said axis extends at an acute angle and a second mirror spaced from and rotatable unitarily with said first mirror so that upon rotation of said assembly said second mirror traces a surface which is a frustum of a right circular cone coaxial with the axis of rotation, said mirrors being normal to a common plane containing said axis;

input optics having an axis coincident with that of said scanner assembly and arranged to create a primary image of an off-axis instantaneous field in an image plane intersecting said frustum, the angular relation between said mirrors being such that radiation from said primary image is reflected by said mirrors sequentially in a beam directed along said axis regardless of the rotated position of said assembly, the area of said second mirror projected on said image plane being comparable to the size of said field of view at said image plane;

and means mounted to receive said beam for giving an output determined thereby, so that as said scanner assembly rotates said output is representative of the intensity of the radiation from arcuately related series of portions of said image plane.

5. Apparatus according to claim 4 in which said input optics includes a spherical element;

and relay optics mounted on said axis for receiving said beam and correcting it for spherical aberration introduced by said spherical element.

6. Apparatus according to claim 4 in which said input optics includes a spherical mirror and relay optics mounted on said axis for receiving said beam, and including catoptric means for correcting for spherical aberration introduced by said spherical mirror.

7. A wide field catoptric optical system having an entrance pupil and comprising, in combination:

a primary spherical mirror having a central aperture;

a plane secondary mirror;

an initial plane scanning mirror rotatable about an axis external thereto which makes an acute angle with the plane thereof;

another plane scanning mirror rotatable about said axis, which passes therethrough and makes an acute angle with the plane thereof;

means causing simultaneous rotational motion of said scanning mirrors;

a first relay mirror mounted on said axis and having a central aperture;

a second relay mirror mounted on said axis and having a central aperture;

and radiation responsive means mounted on said axis;

said mirrors being positioned so that radiation passing said entrance pupil in a direction having a major component parallel to said axis is reflected from said primary spherical mirror and said plane secondary mirror to focus at a primary image plane which said initial scanning mirror continuously intersects at an acute angle, so that radiation from said image plane is serially reflected by said scanning mirrors as a beam emerging coaxial with said axis, and so that said beam passes through all said central apertures and is focused by said relay mirrors on said detector means, the central aperture of one of said relay mirrors comprising the aperture stop of the system.

8. Apparatus according to claim 7 in which one of said relay mirrors is figured to correct the spherical aberration introduced by all said spherical mirrors.

9. Apparatus according to claim 7 in which said relay mirrors are between said scanning mirrors and said primary spherical mirrors.

10. Apparatus according to claim 7 in which said primary spherical mirror is between said scanning mirrors and said relay mirrors.

11. Apparatus according to claim 8 in which said beam falls on said figured relay mirror for reflection to the other relay mirror.

12. Apparatus according to claim 7 in which the dihedral angles of said scanning mirrors are such that radiation entering said pupil at an angle of 5½° with respect to said axis emerges from said second scanning mirror as a beam aligned with said axis, for all rotated positions of said scanning mirrors.

13. Apparatus according to claim 7 in which the center of curvature of said primary spherical mirror is in the plane of said entrance pupil.

* * * * *